United States Patent [19]

Wreede

[11] Patent Number: 4,904,554

[45] Date of Patent: Feb. 27, 1990

[54] GAS PHASE HARDENING OF GELATIN HOLOGRAMS

[75] Inventor: John E. Wreede, Monrovia, Calif.

[73] Assignee: Hughes Aircraft Company, Los Angeles, Calif.

[21] Appl. No.: 170,951

[22] Filed: Mar. 21, 1988

[51] Int. Cl.$^4$ .............................................. G03C 5/22
[52] U.S. Cl. ...................................... 430/2; 430/289; 430/451
[58] Field of Search .................. 430/1, 2, 289, 451

[56] References Cited

U.S. PATENT DOCUMENTS

| | | | |
|---|---|---|---|
| 3,660,091 | 5/1972 | Shankoff et al. | 430/1 |
| 3,943,019 | 3/1976 | Krekeler et al. | 430/4 |
| 4,025,345 | 5/1977 | Kido et al. | |
| 4,029,507 | 6/1977 | Wehner et al. | 430/1 |
| 4,254,193 | 3/1981 | Yokono et al. | |
| 4,366,235 | 12/1982 | Land | |
| 4,367,911 | 1/1983 | Graube | 430/2 |
| 4,422,713 | 12/1983 | Grant et al. | 350/3.61 |
| 4,458,980 | 7/1984 | Ohki et al. | |
| 4,530,736 | 7/1985 | Mutter | |

*Primary Examiner*—Paul R. Michl
*Assistant Examiner*—Mark R. Buscher
*Attorney, Agent, or Firm*—Leonard A. Alkov; W. K. Denson-Low

[57] ABSTRACT

A process for hardening gelatin holograms after dehydration involving subjecting the hologram to an atmosphere containing aldehyde vapor and water vapor. The process provides hardening of the gelatin hologram to increase resistance to moisture and heat without adversely affecting diffraction efficiency. Monitoring of the diffraction efficiency during the aldehyde-water vapor treatment allows fine tuning of the hologram efficiency and evenness.

18 Claims, 1 Drawing Sheet

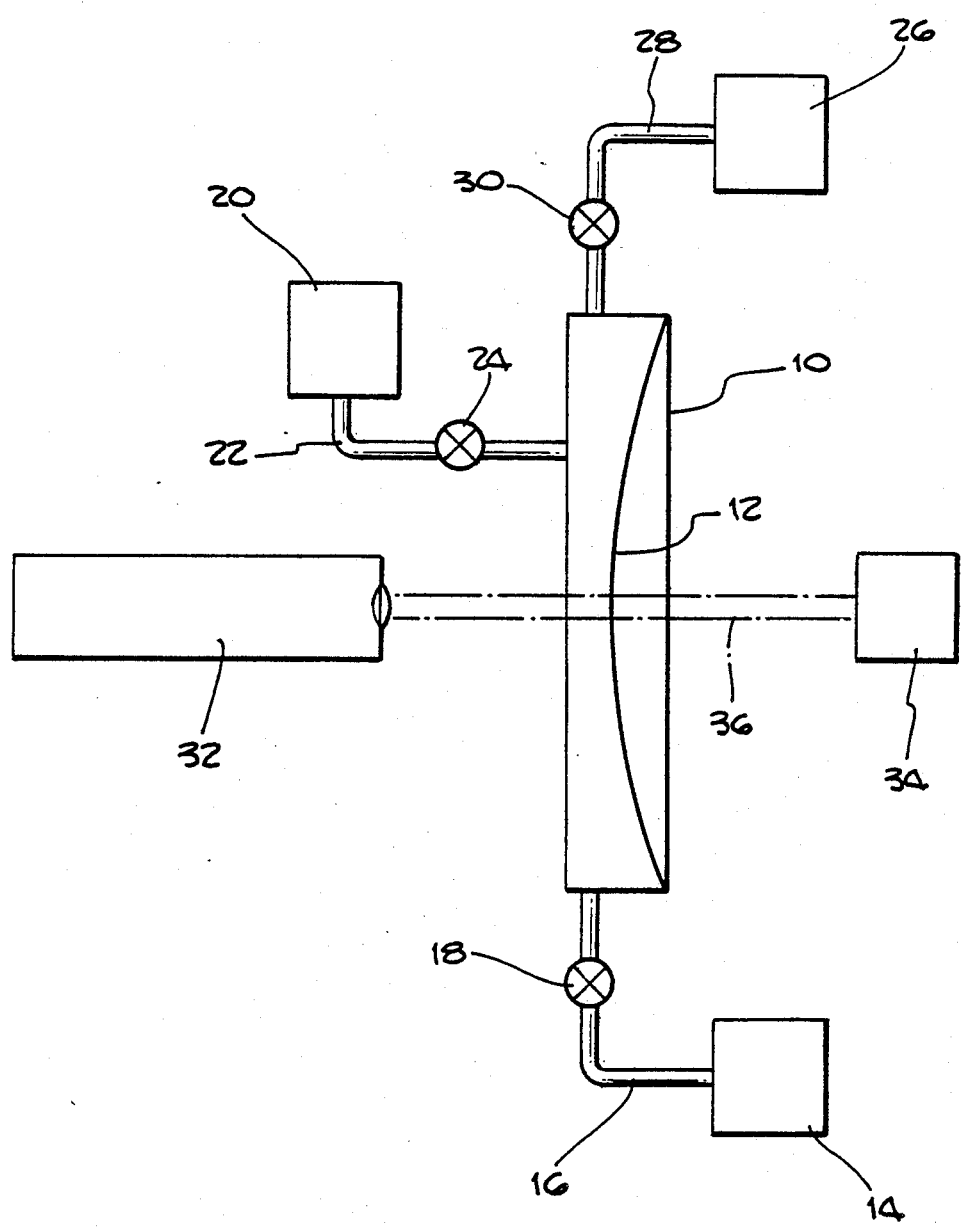

GAS PHASE HARDENING OF GELATIN HOLOGRAMS

BACKGROUND OF THE INVENTION

1. Field of the Invention

The present invention relates generally to processes for preparing holograms and the photosensitive hydrophilic gelatin layers which are present in holograms. More specifically, the present invention deals with methods for hardening the hologram gelatin after it has been developed and dehydrated.

2. Description of Related Art

Holograms are widely used for a variety of purposes including: helmet-mounted displays such as those disclosed in U.S. Pat. No. 3,928,108; eye protective reflectors for laser radiation; and novelty displays, such as pendant jewelry. In fabricating a hologram, a pre-holographic element comprising a hydrophilic, photosensitive layer on a substrate is processed to expose the photosensitive layer to an actinic interference pattern to record a latent image thereon. The photosensitive layer is then developed to obtain the recorded latent image followed by dehydration, drying and hardening.

The gelatins used in forming the holograms are mixtures of proteins containing both acidic and basic groups which make the gelatins hydrophilic. The gelatins can absorb up to ten times their own weight in water. The process of forming the gelatin hologram utilizes the difference in refractive index between hardened and unhardened gelatin to produce the hologram. The differential hardening of the gelatin is provided by photosensitive material such as dichromates, diazo compounds and silver halide emulsions. Dichromated gelatins are the most common types of gelatins used. Since swelling of the gelatin during processing is necessary to get the full difference in refractive index, the gelatins cannot be completely hardened prior to processing.

A common method used for sensitizing and processing dichromate gelatin holograms is described by L. H. Lin, Appl. Opt., Volume 8, No. 5, 963–966 (May 1969) and by R. G. Brandes, E. E. Francois and T. A. Shankoff, Appl. Opt., Volume 8, No. 11, 2346–2348 (November 1969). These methods typically involve preliminary hardening of the gelatin followed by sensitization of the gelatin and exposure followed by development of the hologram. The hologram is then dehydrated in increasing strengths of isopropyl alcohol followed by drying.

It is desirable to increase the resistance of the completed gelatin hologram to attack by moisture and heat. U.S. Pat. No. 4,029,507 describes a process in which the gelatin hologram is treated with formaldehyde during the dehydration step. The combination of formaldehyde with 2-propanol during the dehydration step is disclosed as providing final hardening of the fully processed dichromated gelatin hologram. In carrying out the final hardening of the gelatin hologram, it is important that the efficiency (i.e., refracted index modulation) of the hologram not be adversely affected. Accordingly, it is desirable to harden the gelatin hologram as much as possible to increase its resistance to moisture and heat while at the same time not unduly decreasing the photographic sensitivity.

There is a continuing need to provide processes for stabilizing gelatin holograms after processing which provide increased levels of moisture and heat resistance while still providing high refractive index modulation.

SUMMARY OF THE INVENTION

In accordance with the present invention, a process is provided for hardening gelatin holograms after development and dehydration to increase the stability of the hologram in the presence of moisture and heat while maintaining high diffraction efficiencies or modulation.

The present invention is based on a vapor phase treatment of the gelatin hologram after development and dehydration. The vapor phase treatment, in accordance with the present invention, involves treating the gelatin after dehydration with an atmosphere containing aldehyde vapor and water vapor. The combination of aldehyde vapor and water vapor is believed to cause cross-linking of the gelatin at the amino sites of the gelatin, rather than at the carboxyl sites which are cross-linked by the dichromate during hologram formation. Accordingly, there is no competition between the formaldehyde and dichromate for cross-linking sites so that this final hardening of the gel provides optimum gel hardening without affecting the dichromate cross-linking or hardening.

An advantage of the present invention is that cross-linking or hardening of the full hologram after processing eliminates the problem of insufficient swelling during processing due to initial gel hardening. Hardening of gelatins, in accordance with the present invention, after full hologram processing, provides hard gelatins which are resistant to moisture and heat and which have diffraction efficiencies in excess of 90%. Gelatins hardened to a similar degree prior to hologram processing will have virtually no diffraction efficiency.

As a feature of the present invention, the efficiency of the hologram can be monitored during vapor phase treatment with aldehyde vapor and moisture so that relative levels of gelatin hardening and diffraction efficiency can be accurately and controllably determined.

Another feature of the present invention is that the efficiency and bandwidth of over-exposed and over-developed dichromated gelatin holograms can be trimmed or fine tuned by monitoring the efficiency of the hologram during vapor phase treatment with aldehyde vapor and moisture. The exact efficiency and bandwidth for the hologram can be obtained by controlling the aldehyde vapor content and moisture content of the atmosphere surrounding the hologram and treatment times. Unevenness in the hologram can also be corrected by controlling the atmosphere.

The above-discussed and many other features and attendant advantages of the present invention will become apparent as the invention becomes better understood by reference to the following detailed description when considered in conjunction with the accompanying drawings.

BRIEF DESCRIPTION OF THE DRAWING

The FIGURE is a schematic representation of a preferred system suitable for treating developed holograms in accordance with the present invention.

DESCRIPTION OF THE PREFERRED EMBODIMENTS

The present invention is directed to treating gelatin holograms after they have been developed, in order to harden the hologram to increase its resistance against heat and moisture. The invention has application to a wide variety of gelatin holograms made from photosensitive, hydrophilic gelatin materials such as dichromated gelatin, diazo gelatin and silver halide emulsions. The following description will be limited to the treatment of dichromated gelatins used in preparing holograms for pilot visors and the like, with it being understood that the invention has application to other gelatins used in holograms.

Dichromate gelatin holograms or photo layers are conventionally made in a four step process involving sensitization of the gelatin and exposure followed by development, dehydration and baking. Preliminary hardeners are also generally incorporated into the gelatin prior to treatment to protect the gelatin against being washed out. Typical methods for processing dichromated gelatin holograms are set forth by L. H. Lin, Appl. Opt., Volume 8, No. 5, 963–966 (May 1969) and by R. G. Brandes, E. E. Francois and T. A. Shankoff, Appl. Opt., Volume 8, No. 11, 2346–2348 (November 1969). In accordance with the present invention, the use of a preliminary hardener is substantially reduced or eliminated.

The conventional steps of processing dichromated gelatins including the sensitization, exposure, development, dehydration and drying are not part of the present invention and will not be described in detail since they are conventionally known. The present invention involves treating the processed hologram after is has been dehydrated in order the increase the resistance of the hologram to moisture and heat. The present invention is an improvement upon the process described in U.S. Pat. No. 4,029,507 issued to Wehner et al. wherein the developed hologram is dehydrated in a bath containing isopropanol to which formaldehyde has been added. The contents of the this patent is hereby incorporated by reference. It is believed that vapor phase hardening in accordance with the present invention provides a more stable hologram than Wehner's method. However, all three hardening processes could be used in combination, i.e., some prehardening, some hardening while in alcohol, and vapor phase hardening.

Isopropanol is the conventional liquid used to dehydrate dichromated gelatins after development. In accordance with the present invention, the gelatin is treated with an aldehyde after the isopropanol or other dehydrating liquid has been removed from the gelatin. The vapor phase treatment of the gelatin after removal of the isopropanol is believed to provide suitable hardening of the gelatin without reducing the diffraction efficiency. The efficiencies obtainable using applicant's post-dehydration vapor phase treatment are above 90%, whereas the efficiencies obtainable by the process disclosed in U.S. Pat. No. 4,029,507 utilizing a simultaneous dehydration and formaldehyde treatment are on the order of 80%. In addition, applicant's vapor phase process provides control and fine tuning of the hologram refractive efficiency which are not possible when the hologram is treated with formaldehyde during the dehydration step.

Before the hologram is processed in accordance with the present invention, it should be prepared according to the conventional procedures previously described including dehydration with isopropanol and drying to remove the isopropanol. Typically, drying or baking of the hologram is carried out at temperatures of about 100° C. for times ranging from 1 hour to 1 month.

The dehydrated gelatin is treated by placing it in an atmosphere of aldehyde vapor and water vapor. Preferred aldehydes include formaldehyde and acetaldehyde. Other suitable aldehydes include propionaldehyde and butyraldehyde. Formaldehyde vapor is the preferred vapor. The concentration of aldehyde vapor in the atmosphere surrounding the dehydrated hologram is preferably between about 5 l to 20 volume percent with about 8 volume percent being preferred. The amount of moisture present in the atmosphere is preferably sufficient to provide a relative humidity of between about 10 to 30 with relative humidities on the order of 20 being preferred. The temperature of the dehydrated hologram and the surrounding aldehyde-moisture atmosphere during the treatment is preferably between about 20° C. to 25° C.

The treatment times for exposure of the dehydrated hologram to the above described aldehyde-water vapor atmosphere can be varied depending upon the final hardness and diffraction efficiency desired. Typically, exposure times of between 5–30 minutes are sufficient. The diffraction efficiency of the hologram is preferably monitored during treatment to allow fine tuning and control of the hardening process.

An exemplary system for monitoring the process of the present invention is shown in the FIGURE. The system includes a treatment chamber 10 in which the hologram 12 is located for treatment. Varying amounts of formaldehyde vapor, water vapor and nitrogen are introduced into the chamber 10 in order to control the atmosphere content. Aldehyde vapor is stored in container 14 and introduced through inlet line 16 as controlled by valve 18. Water vapor is stored in container 20 and introduced into chamber 10 through inlet 22 as controlled by valve 24. The nitrogen is stored in nitrogen tank 26 and introduced into chamber 10 through inlet line 28 as controlled by valve 30. The water vapor is stored as wet nitrogen which is mixed with the dry nitrogen to provide desired moisture levels in the chamber 10. Any other suitable inert gas can be used in place of nitrogen if desired.

Monitoring of the hologram during treatment is provided by a monochromater 32 and detector 34. The particular wavelength of light passed through the hologram (shown at 36) and monitored during treatment can be varied depending upon the particular hologram. The use of the monochromater-detector system (32,34) to monitor both wavelength and efficiency during the treatment allows accurate control of both hardening and efficiency. The amount of moisture released into the chamber along with the amount of aldehyde vapor are varied to achieve the desired final efficiency and bandwidth. When the desired efficiency is reached, the treatment chamber 10 is flushed with nitrogen to stop further hardening. The pressure within treatment chamber 10 is preferably kept below 200 atmospheres. A pressure of around 1 atmosphere is preferred.

An example of practice is as follows:

A glass plate is prepared with a thin film of dichromated gelatin on the plate. This may be coated directly with ammonium dichromate in the gelatin solution to be coated or the gelatin can be coated first and the clear gelatin soaked in an ammonium dichromate solution. If the gelatin is precoated as a silver halide plate (for example Kodak 649 plate), the silver halide is removed by fixing and then the plate soaked in ammonium dichromate solution. By any of the three methods, the spectral transmission of the sensitized plate should be 85–95% (after compensating for reflective losses) at the argon laser wavelength (514.5 mm) (5 to 15% absorption due to the dichromate).

The plate is then dried for 12-24 hours at approximately 30% relative humidity (RH) at 20°0 C. and then can be further dried for 2-24 hours at less than 2% RH at 20° C. The plate is then placed in a holographic exposure system. If the more extensive drying is used, an index matching fluid provides both a moisture protection and refractive index matching. If left open to the air during exposure, only the initial drying is used so that there will be little or no change in thickness of the gelatin due to changes in moisture content during stabilization and exposure. The plate is then exposed to a stable interference pattern from two beams of an argon laser operating at 514.5 nm. An exposure of 150 mj to 600 mj is commonly used.

Depending on the exposure level, a hologram may be just visible. The excess dichromate is removed by soaking in a 30 millimolar solution of triethanol amine in water for 5 minutes at 2°-25° C. This bath also serves to swell the gelatin. While the gelatin is in an expanded state, the plate is rapidly dehydrated by immersing 5 minutes each in 70% 2-propanol in water, 90% 2-propanol in water, and two separate baths of 100% 2-propanol with less than 0.1% water. The last alcohol bath may be at 60°-70° C. The rapid dehydration causes a differential function in the refractive index of the gelatin corresponding to the original light interference pattern making up the holographic exposure. The result is a phase only hologram since the gelatin itself is now clear.

Even though the hologram is visible while still wet with the 2-propanol, it is very unstable. The gelatin at this point is approximately twice the original thickness of approximately 17 micrometers. In a reflection type hologram, the image seen is a second order diffraction and will disappear and then reappear in the red as the hologram is dried and the gelatin shrinks. Evaporation of the alcohol can be accomplished by putting the hologram in a drybox with a flow of air or nitrogen with a relative humidity of under 5%. Alternately, a heat gun source can give the same relative humidity out of room air and will help the alcohol evaporate more quickly.

Once the alcohol has evaporated, the gelatin is more stable but still requires a bake cycle of 8 to 500 hours at 60° C. to 100° C. in order to reach a final thickness. While still wet with alcohol, the hologram loses efficiency if exposed to as low as 25% relative humidity at room temperature. After drying it is less likely to lose efficiency. After the full bake cycle, the gelatin is harder yet and the hologram is even less likely to lose efficiency when exposed to moisture. After the full bake cycle, the gelatin is approximately thicker than the original thickness.

After a short bake of 1-2 hours at 60° C., the hologram efficiency is stable enough in 20% relative humidity that the gelatin can be hardened (or tanned) with formaldehyde vapor. The hardening effect of the aldehyde is much less if there is no moisture in the air. After the hardening, the bake cycle can be resumed until a stable thickness is reached. The final thickness is about 10% thinner than without the aldehyde hardening or about 5% thinner than at the time of exposure. The shorter the bake cycle before hardening, the thicker the final gelatin layer will be (the longer the wavelength for a reflection hologram). The formaldehyde vapor concentration is equivalent to approximately 0.05 gms of paraformaldehyde per liter for 10-15 minutes at 20° C. Typically, more paraformaldehyde is used to compensate for leakage or loss in the system.

The moisture present during aldehyde vapor hardening is critical. 20% RH is near optimum for the aldehyde concentration given. At other moisture levels, the time and aldehyde concentration would have to be adjusted. Alternately, acetaldehyde maintained at approximately 15° C. will give a proper level of aldehyde vapor above the liquid to properly harden the above sample in 5 to 10 minutes. Again, the bake cycle can be resumed after hardening.

A feature of the above process is that the final thickness of the gelatin (which means final stable wavelength for a reflection type hologram) is somewhat dependent on the thickness at the time of application of the aldehyde. This in turn is dependent on the length of time the hologram has been baked. This then provides a means of adjusting the wavelength of the peak reflection of a hologram after development and after you can measure the wavelength and efficiency.

Having thus described exemplary embodiments of the present invention, it should be noted by those skilled in the art that the within disclosures are exemplary only and are not an exhaustive listing of all of the materials and process parameters and that various other alternatives, adaptations and modifications may be made within the scope of the present invention. Accordingly, the present invention is not limited to the specific embodiments as illustrated herein, but is only limited by the following claims.

What is claimed is:

1. A process for hardening gelatin holograms after dehydration and removing the dehydration agent comprising the step of treating a dehydrated hologram with a sufficient amount of aldehyde vapor along with and in the presence of a sufficient amount of water vapor and for a sufficient time to harden said dehydrated hologram.

2. A process for hardening gelatin holograms according to claim 1 wherein said aldehyde vapor comprises an aldehyde selected from the group consisting of formaldehyde, acetaldehyde, propionaldehyde and butyraldehyde.

3. A process for hardening gelatin holograms according to claim 2 wherein said aldehyde is formaldehyde.

4. A process for hardening gelatin holograms according to claim wherein the concentration of aldehyde vapor in the atmosphere surrounding said dehydrated hologram is between about 5 to 20 volume percent.

5. A process for hardening gelatin holograms according to claim 4 wherein the concentration of said aldehyde vapor in the atmosphere surrounding said dehydrated hologram is about 8 volume perecent.

6. A process for hardening gelatin holograms according to claim 1 wherein the amount of water vapor in the atmosphere surrounding said dehydrated hologram provides said atmosphere with a relative humidity of between about 10 to 30.

7. A process for hardening gelatin holograms according to claim 6 wherein the relative humidity of the atmosphere surrounding said dehydrated hologram is about 20.

8. A process for hardening gelatin holograms according to claim 1 wherein the transmission characteristics of said dehydrated hologram are measured during said hardening process in order to monitor the extent of hardening.

9. In a process for making a gelatin hologram which includes the steps of dehydrating the gelatin hologram in alcohol after development of the gelatin hologram and then removing the alcohol from the gelatin to provide an alcohol evaporated gelatin hologram, wherein the improvement comprises treating said alcohol-evaporated gelatin with a sufficient amount of aldehyde vapor along with and in the presence of a sufficient amount of water vapor and for a sufficient time to harden said alcohol evaporated gelatin hologram.

10. The improved process according to claim 9 wherein said aldehyde vapor comprises an aldehyde selected from the group consisting of formaldehyde, acetaldehyde, propionaldehyde and butyraldehyde.

11. The improved process according to claim 10 wherein said aldehyde is formaldehyde.

12. The improved process according to claim 8 wherein the concentration of aldehyde vapor in the atmosphere surrounding said dehydrated gelatin hologram is between about 5 to 20 volume percent.

13. The improved process according to claim 12 wherein the concentration of aldehyde vapor in the atmosphere surrounding said dehydrated gelatin hologram is about 8 volume percent.

14. The improved process according to claim 9 wherein the amount of water vapor in the atmosphere surrounding said alcohol-evaporated gelatin hologram provides said atmosphere with a relative humidity of between about 10 to 30.

15. The improved process according to claim 14 wherein the relative humidity of the atmosphere surround said alcohol-evaporated gelatin hologram is about 20.

16. The improved process according to claim 9 including the additional step of measuring the transmission characteristics of said alcohol-evaporated gelatin hologram during treatment with said aldehyde vapor to monitor the extent of hardening.

17. A process for hardening gelatin holograms according to claim 1 wherein said gelatin hologram is a dichromated gelatin hologram.

18. The improved process for hardening gelatin holograms according to claim 9 wherein said gelatin hologram is a dichromated gelatin hologram.

* * * * *